(12) United States Patent
Aoki

(10) Patent No.: US 8,879,936 B2
(45) Date of Patent: Nov. 4, 2014

(54) INFORMATION PROCESSING APPARATUS, PRINTING APPARATUS, AND INFORMATION PROCESSING METHOD

(75) Inventor: Kunitoshi Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 13/082,641

(22) Filed: Apr. 8, 2011

(65) Prior Publication Data

US 2011/0293302 A1    Dec. 1, 2011

(30) Foreign Application Priority Data

May 25, 2010    (JP) .................................. 2010-119731

(51) Int. Cl.
*G03G 15/00* (2006.01)
*G01B 11/06* (2006.01)

(52) U.S. Cl.
CPC ........ *G01B 11/0616* (2013.01); *G03G 15/5058* (2013.01); *G03G 15/5041* (2013.01)
USPC .................. 399/49; 399/46; 399/72

(58) Field of Classification Search
USPC .................... 399/46, 49, 51, 60, 72
See application file for complete search history.

(56) References Cited

U.S. PATENT DOCUMENTS

| 5,245,390 | A | 9/1993 | Ishigaki et al. |
| 6,603,934 | B2 * | 8/2003 | Shimmura ...................... 399/49 |
| 7,848,694 | B2 | 12/2010 | Nakatake et al. |
| 2003/0118361 | A1 | 6/2003 | Shimmura |
| 2005/0232648 | A1 | 10/2005 | Nishizawa et al. |
| 2010/0021196 | A1 | 1/2010 | Atsumi et al. |
| 2010/0166443 | A1 | 7/2010 | Muto |
| 2010/0166445 | A1 | 7/2010 | Aoki |

FOREIGN PATENT DOCUMENTS

| CN | 101046662 A | 10/2007 |
| CN | 101082800 A | 12/2007 |
| JP | 4-221972 A | 8/1992 |
| JP | 7-25070 A | 1/1995 |
| JP | 8-327331 A | 12/1996 |
| JP | 9-96934 A | 4/1997 |
| JP | 11-052637 A | 2/1999 |
| JP | 2002-40731 A | 2/2002 |
| JP | 3436331 B2 | 8/2003 |
| JP | 2005-326806 A | 11/2005 |
| JP | 2008-64953 A | 3/2008 |
| JP | 2008-167104 A | 7/2008 |

(Continued)

OTHER PUBLICATIONS

Notice of Reasons for Refusal dated Mar. 9, 2012, in counterpart Japanese Application No. 2010-119731.
Chinese Office Action dated Jul. 15, 2013, in related Chinese Patent Application No. 2011101376210 (with English translation).

*Primary Examiner* — Hoang Ngo
(74) *Attorney, Agent, or Firm* — Fitzpatrick, Cella, Harper & Scinto

(57) ABSTRACT

One aspect of the present invention provides an information processing apparatus for determining a height of a toner image formed on a carrier, the apparatus comprising: a control unit configured to control an amount of irradiation light based on whether laser light irradiated by an irradiation unit is irradiated onto the toner image; an acquisition unit configured to acquire an image obtained by capturing reflected light of the laser light irradiated by the irradiation unit; and a determination unit configured to determine the height of the toner image based on the acquired image.

15 Claims, 9 Drawing Sheets

(56) References Cited

FOREIGN PATENT DOCUMENTS

| | | |
|---|---|---|
| JP | 2008-216600 A | 9/2008 |
| JP | 2008-2166600 A | 9/2008 |
| JP | 2010-49233 A | 3/2010 |
| JP | 2010-152132 A | 7/2010 |
| JP | 2010-152134 A | 7/2010 |
| JP | 2010-152137 A | 7/2010 |

* cited by examiner

LIGHT AMOUNT TIMING CHART

INFORMATION PROCESSING APPARATUS, PRINTING APPARATUS, AND INFORMATION PROCESSING METHOD

BACKGROUND OF THE INVENTION

1. Field of the Invention

The present invention relates to technology for measuring the amount of toner on a medium.

2. Description of the Related Art

A color output by an image forming apparatus that uses toner varies depending on the environment. For example, if temperature/humidity varies, latent image potential, toner supply amount, transfer efficiency, and the like also vary. Thus, the amount of toner adhering to the photosensitive drum and the transfer belt is not constant. In view of this, technology for controlling the exposure amount, developing voltage, transfer current, and the like based on the measured amount of adhering toner has been conventionally developed. For example, according to a method described in Japanese Patent Laid-Open No. 8-327331, light is projected onto patches formed based on patch data. The amount of toner can be measured by detecting light reflected by the patches.

Japanese Patent Laid-Open No. 2008-216600 discloses an optical displacement meter. The optical displacement meter described in Japanese Patent Laid-Open No. 2008-216600 performs feedback control on the intensity of incident light such that the intensity of reflected light is appropriate. If the intensity of reflected light is too weak, accurate measurement is difficult. Further, if the intensity of reflected light is too strong, a measured value that a light reception unit outputs will be saturated. In order to cope with such problems, feedback control is used in Japanese Patent Laid-Open No. 2008-216600.

There is a difference between the amount of toner that adheres to a solid black patch and a patch formed using screen technology (including halftone technology and dithering technology). Accordingly, in order to appropriately control image formation using screen technology, it is necessary to measure the toner amount of a patch formed using screen technology. However, a patch formed using screen technology has both a portion to which toner adheres and a portion where a medium is exposed. Furthermore, a portion to which toner adheres and a portion where a medium is exposed often repeat at intervals of 100 and several tens of µm. Since the toner and the medium have different reflectance, the amount of received light will not be stable, even if feedback control is performed when measurement with respect to such a minute patch is performed.

SUMMARY OF THE INVENTION

The present invention enables more accurate measurement of the amount of toner on a patch having a minute pattern.

According to one aspect of the invention, an information processing apparatus for determining a height of a toner image formed on a carrier comprises: a control unit configured to control an amount of irradiation light based on whether laser light irradiated by an irradiation unit is irradiated onto the toner image; an acquisition unit configured to acquire an image obtained by capturing reflected light of the laser light irradiated by the irradiation unit; and a determination unit configured to determine the height of the toner image based on the acquired image.

According to another aspect of the invention, an information processing method for determining a height of a toner image formed on a carrier comprises: controlling an amount of irradiation light based on whether laser light irradiated by an irradiation unit is irradiated onto the toner image; acquiring an image obtained by capturing reflected light of the laser light irradiated by the irradiation unit; and determining the height of the toner image based on the acquired image.

According to the present invention, the amount of toner on a patch having a minute pattern can be more accurately measured.

Further features of the present invention will become apparent from the following description of exemplary embodiments with reference to the attached drawings.

DESCRIPTION OF THE EMBODIMENTS

Below is a description of embodiments of the present invention based on drawings. However, the scope of the present invention is not limited to the following embodiments.

Embodiment 1

Figure 1A:
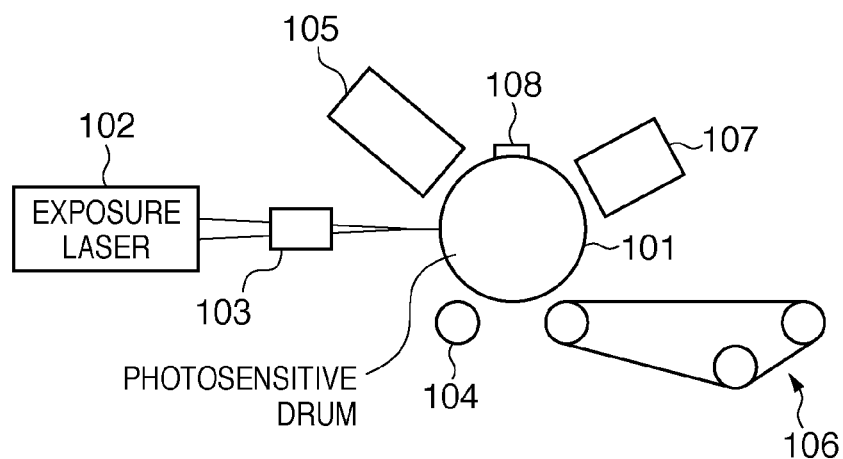
FIGS. 1A and 1B are diagrams showing examples of a configuration of a printing apparatus according to Embodiment 1.

The present embodiment describes a method for measuring the amount of toner, in an electrophotographic image forming apparatus. FIG. 1A shows an example of an image forming apparatus according to the present embodiment. A charging roller 104 charges the surface of a photosensitive drum 101. Next, an exposure laser 102 and a polygon mirror 103 create an electrostatic latent image on the photosensitive drum 101 in accordance with patch data (printing unit). Then, a developing device 105 forms a toner patch 108 on the photosensitive drum 101. The photosensitive drum 101 is driven by a driving unit (not shown), and the toner patch 108 on the photosensitive drum 101 is transferred onto a transfer belt 106. The transfer belt 106 is also driven by the driving unit (not shown), and the toner patch 108 on the transfer belt 106 is transferred onto a recording medium. In this way, an image is formed on a recording medium (on a printing medium).

Figure 1B:
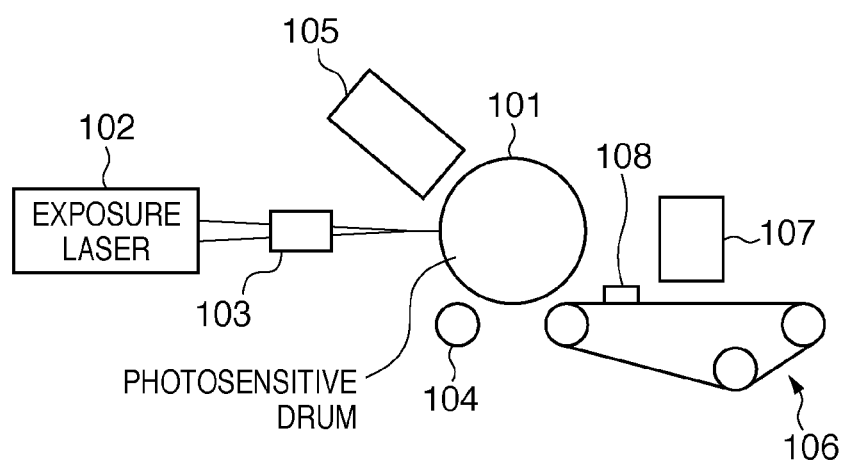

The toner amount of the toner patch 108 (toner patch on a transfer unit) formed by the developing device 105 is measured by a measurement apparatus 107. In the present embodiment, the measurement apparatus 107 performs measurement with respect to the toner patch 108 on the photosensitive drum 101. However, the measurement apparatus 107 can perform measurement with respect to a toner patch on an arbitrary medium. For example, as shown in FIG. 1B, the measurement apparatus 107 can also perform measurement with respect to the toner patch 108 on the transfer belt 106. In this specification, the photosensitive drum 101 may be referred to as a carrier. Further, the transfer belt 106 may be referred to as a transfer unit. In the present embodiment, the measurement apparatus 107 measures the toner amount of the toner patch 108 carried on a medium. The measurement target of the measurement apparatus 107 is not limited to the photosensitive drum 101 and the transfer belt 106, and may be an arbitrary medium that carries toner. In this specification, the words "carrier" and "transfer unit" each mean an arbitrary medium that carries toner. For example, "carrier" or "transfer unit" can be constituted so as to temporarily carry a toner image to be transferred onto a printing medium such as paper, for example.

Figure 3:
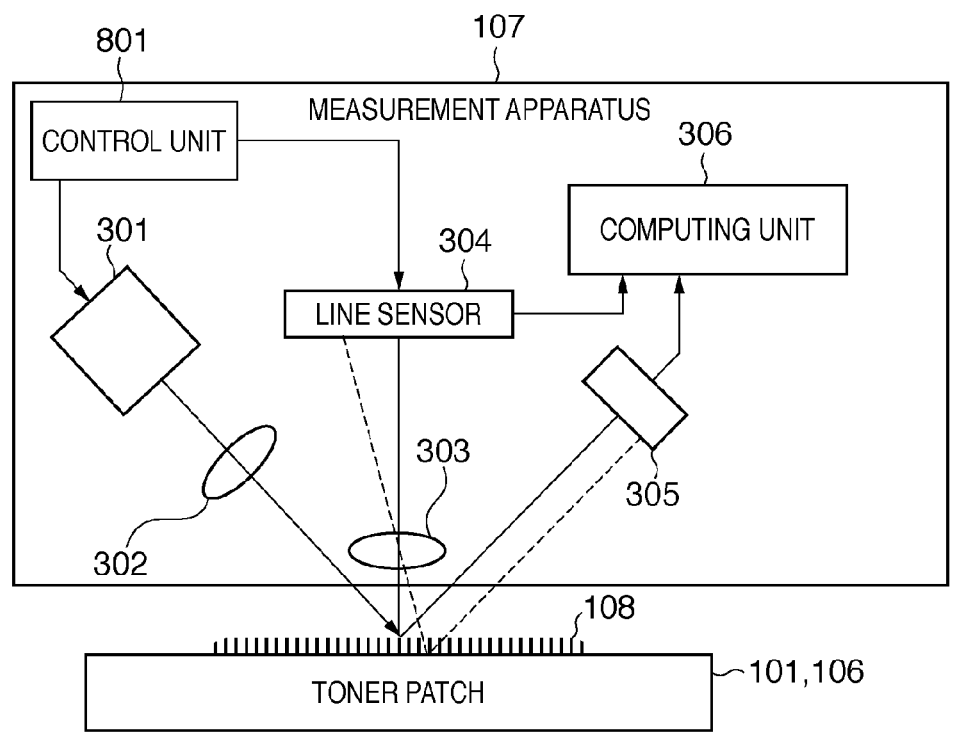
FIG. 3 is a diagram showing an example of a configuration of a measurement apparatus according to Embodiment 1.

An example of the measurement apparatus 107 according to the present embodiment is shown in FIG. 3. A laser light source 301 projects light onto the carrier (and the toner patch 108 on the carrier) (projection unit). A condensing lens 302 condenses laser light from the laser light source 301 at a light irradiation point on the surface of the carrier (on the surface of the transfer unit). A light receiving lens 303 forms an image from light reflected from the carrier on image sensors of a line sensor 304 (light receiving unit). The light receiving lens 303 is constituted so as to form an image from reflected light on a corresponding image sensor according to the distance from the position on the carrier surface at which light is reflected. Thus, the thickness of a toner layer can be determined based on the intensity of light that has entered each of the image sensors of the line sensor 304.

A computing unit 306 can calculate the thickness of a toner layer and the toner amount thereof by analyzing a signal generated by the line sensor 304. In the present embodiment, the reflection position and the light amount of light that has been diffusely reflected are detected at the same time using the line sensor 304. A photodiode 305 may be installed at a position where light that has been specularly reflected on the carrier can be measured.

Figure 4A:
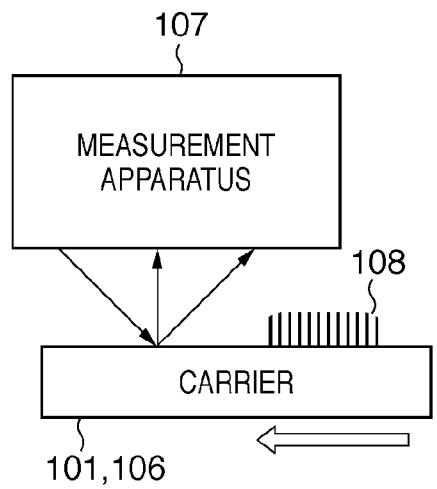
FIGS. 4A to 4D are diagrams showing a method for measuring the amount of toner according to Embodiment 1.

Below is a detailed description of a method for the measurement apparatus 107 to measure the amount of toner, with reference to FIGS. 4A to 4D. As shown in FIG. 4A, first, the carrier is driven such that laser light from the laser light source 301 is irradiated onto the carrier surface on which a toner patch is not formed. Then, light that has been diffusely reflected by the carrier surface enters the line sensor 304. In this way, the line sensor 304 obtains a diffused reflection waveform 401 shown in FIG. 4C. The diffused reflection waveform 401 shows an intensity distribution of light that has entered the line sensor 304, with respect to light receiving positions.

Figure 4B:
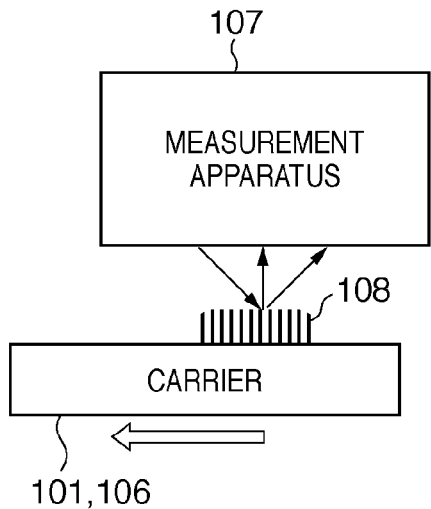
Figure 4C:
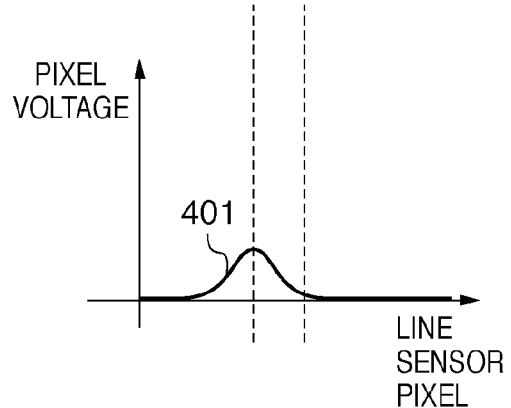
Figure 4D:
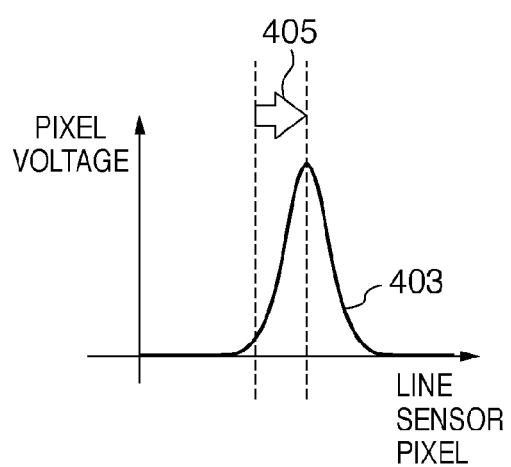

Next, as shown in FIG. 4B, the carrier is driven such that laser light from the laser light source 301 is irradiated onto the toner patch 108. Then, light diffusely reflected by the toner patch 108 enters the line sensor 304. In this way, the line sensor 304 obtains a diffused reflection waveform 403 shown in FIG. 4D.

The carrier is actually driven at a certain constant speed (process speed). Accordingly, the toner patch 108 automatically passes under the measurement apparatus 107. The line sensor 304 can acquire a plurality of waveform data corresponding to the positions of the plurality of toner patch 108, by causing the line sensor to continuously operate at a sufficiently short cycle.

Figure 5:
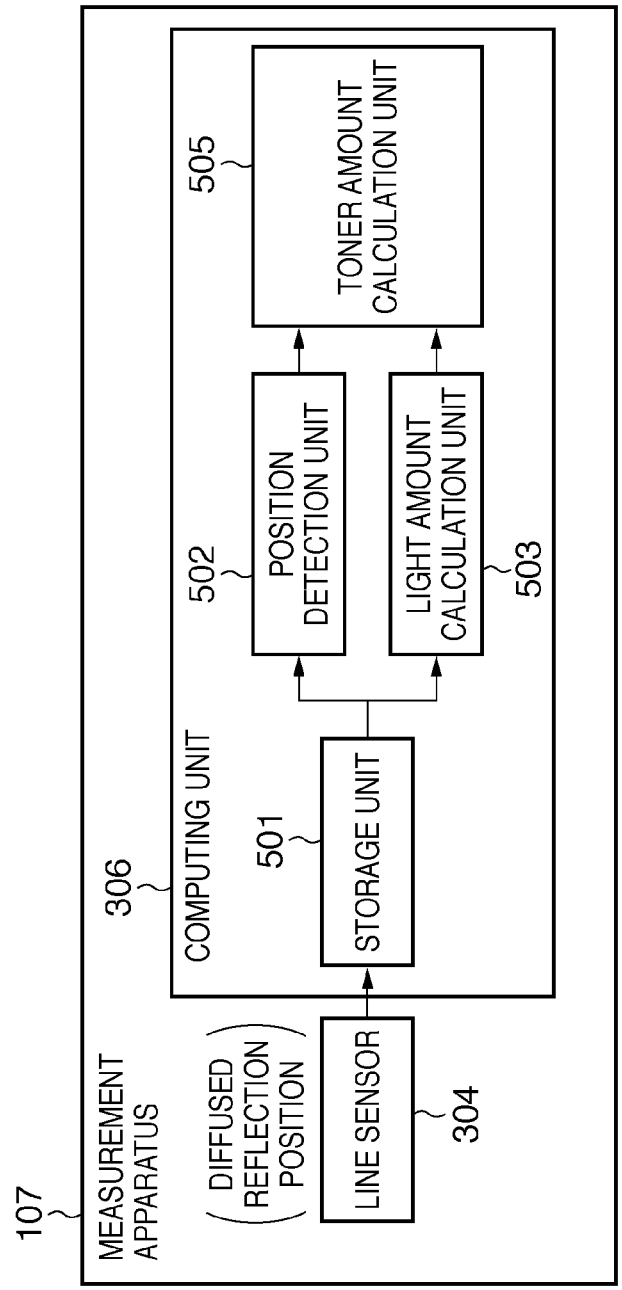
FIG. 5 is a detailed block diagram of a computing unit 306 according to Embodiment 1.

FIG. 5 shows an example of a configuration of the computing unit 306. Processing for calculating the amount of toner will be described with reference to FIG. 5. Waveform data detected by the line sensor 304 is stored in a storage unit 501. A position detection unit 502 detects a waveform peak position of a waveform indicated by the waveform data stored in the storage unit 501. Here, a peak position indicates a pixel position indicating the highest intensity. The position detection unit 502 compares the waveform 401 of light reflected by the carrier surface with the waveform 403 of light reflected by the toner patch. Then, the position detection unit 502 detects the amount of movement of the peak position between the waveform 401 and the waveform 403. The amount of movement of the peak position corresponds to the height of toner from the carrier surface.

A light amount calculation unit 503 calculates the area of waveform peak portions indicated by the waveform data stored in the storage unit 501. Specifically, the light amount calculation unit 503 calculates the area of a peak portion of the waveform 401 of light reflected by the carrier surface, and that of the waveform 403 of light reflected by the toner patch. Then, the light amount calculation unit 503 detects the amount of change in the area of the peak portion between the waveform 401 and the waveform 403. The amount of change in the area of a peak portion corresponds to the amount of change in the amount of diffused reflection light.

A toner amount calculation unit 505 calculates the amount of toner on the carrier based on the amount of movement of the peak position detected by the position detection unit 502 and the amount of change in the area of the peak portion detected by the light amount calculation unit 503. The toner amount can be calculated based on a look-up table held by the toner amount calculation unit 505, for example. The toner amount can also be calculated by the toner amount calculation unit 505 performing calculation in accordance with an appropriate calculation expression.

As described above, the line sensor 304 can acquire waveform data corresponding to the positions of the plurality of toner patches 108. The toner amount calculation unit 505 can calculate the amount of toner (thickness of toner) with respect to each waveform. The toner amount calculation unit 505 can also calculate the toner amount of all the toner patches 108 based on the amounts of toner corresponding to the respective positions of the toner patches 108.

As described above, the position detection unit 502 (and the light amount calculation unit 503) detects peaks of the waveforms 401 and 403. In the present embodiment, the position detection unit 502 performs fitting between a waveform and a Gaussian function in order to detect a peak. For example, the position detection unit 502 can perform fitting using the least square method. Then, the position detection unit 502 detects a peak position using a parameter of the Gaussian function after fitting.

A Gaussian function is a function having a bell-shaped peak indicated by Expression (1). In Expression (1), $\mu$ represents a parameter indicating the X coordinate of a peak position. Further, A represents a parameter indicating the height and width of the peak.

$$f(x) = \frac{A}{\sqrt{2\pi\sigma^2}} \exp\left\{-\frac{(x-\mu)^2}{2\sigma^2}\right\} + C \quad (1)$$

Parameters μ and A that are obtained by fitting this expression to waveform data can be taken as waveform feature amounts. The position detection unit 502 can obtain a peak position from the parameter μ obtained in this way.

Fitting to a Gaussian function has been performed in the present embodiment. However, fitting may be performed between a waveform and an expression other than a Gaussian function. For example, a Lorentz function (Expression (2)) and a quadratic function (Expression (3)) can also be used. Further, a peak position may be obtained by detecting the maximum value of a waveform.

$$f(x) = \frac{2A}{\pi} \cdot \frac{w}{4(x-x_c)^2 + w^2} + C \quad (2)$$

$$f(x) = A(x-B)^2 + C \quad (3)$$

Figure 2:
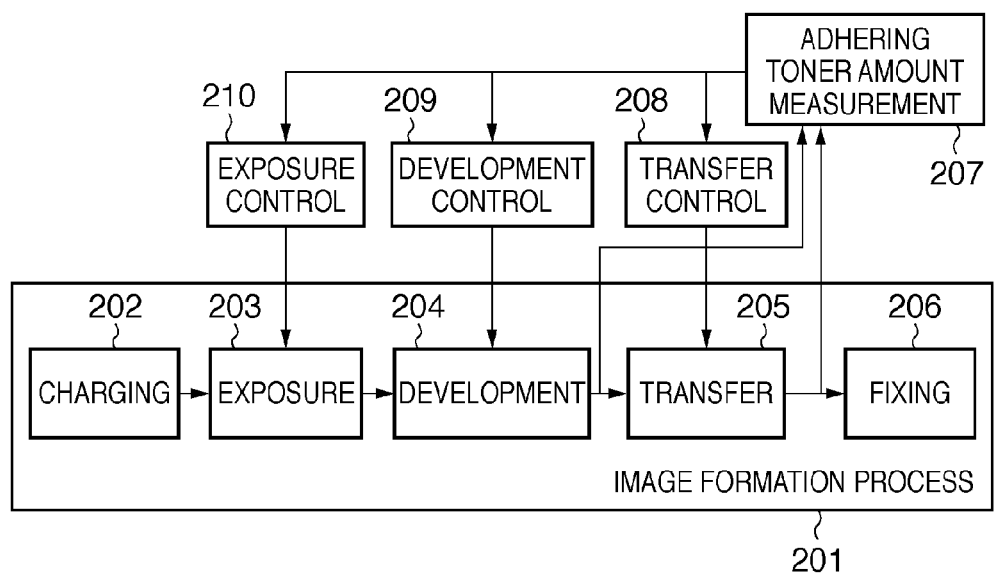
FIG. 2 is a control block diagram of the printing apparatus according to Embodiment 1.

FIG. 2 is a block diagram showing a printing process performed by the image forming apparatus according to the present embodiment. In an image formation process 201, a charging step 202, an exposure step 203, a development step 204, a transfer step 205, and a fixing step 206 are sequentially performed. In the present embodiment, a measurement step 207 is performed after the development step 204 or the transfer step 205. In the measurement step 207, the measurement apparatus 107 measures the toner amount of the toner patch 108. In accordance with the measurement result in the measurement step 207, a transfer control step 208, a development control step 209, and an exposure control step 210 are performed.

Based on the result of comparison between patch data used to form the toner patch 108 and the measurement result in the measuring process 207, the printing control steps 208 to 210 are performed such that an image to be formed has ideal colors. For example, a transfer current in the transfer process 205 is controlled in the transfer control step 208. In the development control step 209, a developing bias voltage or toner supply amount in the development step 204 is controlled. In the exposure control step 210, tone γ characteristics are controlled, for example.

The output of the exposure laser 102 may be directly controlled in the exposure control step 210. On the other hand, generation of print data used for driving the image forming apparatus may be controlled in the exposure control step 210. For example, the processing of converting input image data into print data performed by the image forming apparatus according to the present embodiment may be controlled in the exposure control step 210. Further, the processing in which an information processing apparatus such as a computer generates, from image data, print data to be input to the image forming apparatus according to the present embodiment may be controlled in the exposure control step 210. For example, a controller 506 shown in FIG. 8 can perform the printing control steps 208 to 210.

Figure 6A:
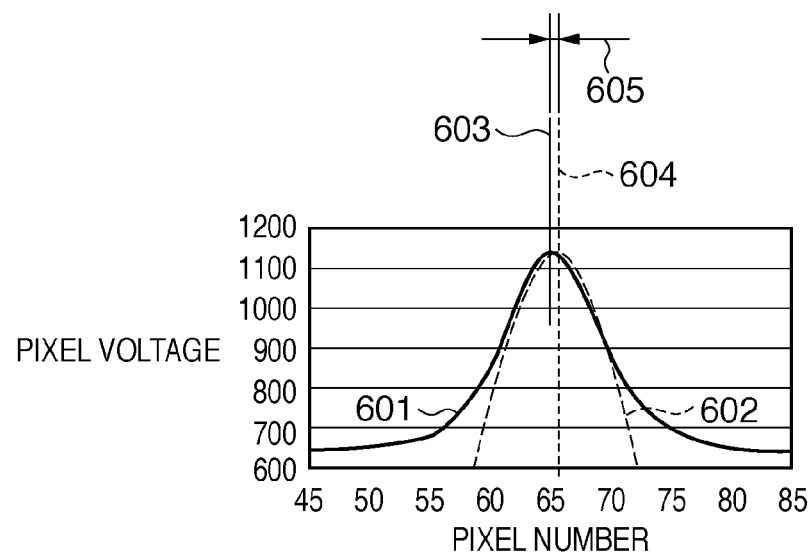
FIGS. 6A and 6B are diagrams showing a method for detecting of a peak position according to Embodiment 1.

As described above, the position detection unit 502 (and the light amount calculation unit 503) detects the peaks of the waveforms 401 and 403. However, the accuracy of peak detection depends on the intensity of light that enters the line sensor 304. The relationship between the amount of light and peak detection accuracy is described below with reference to FIGS. 6A and 6B. In FIG. 6A, a waveform 602 is fitted to an captured waveform 601. As shown in FIG. 6A, a shift 605 exists between a peak position 603, 604 of the captured waveform 601 and a peak position of the waveform 602.

Figure 6B:
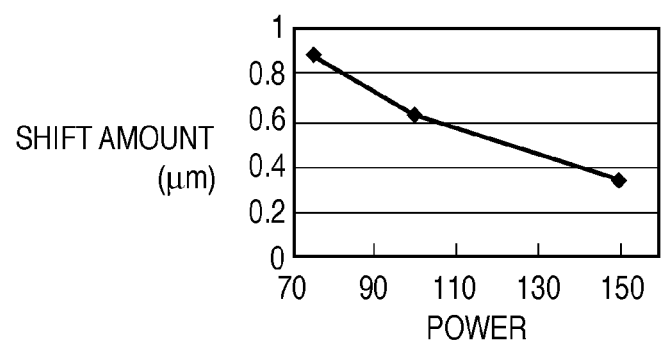

The graph in FIG. 6B shows the relationship between the output laser power of the laser light source 301 and the above shift. As shown in FIG. 6B, the shift increases the more the laser power decreases. Specifically, more accurate fitting can be performed by increasing the laser power. As a result, a peak position can be detected more accurately.

However, ordinarily, a reflection characteristic of the carrier and a reflection characteristic of the surface of toner do not match. In the examples in FIGS. 4A to 4D, the reflectance of the carrier is lower than the reflectance of the toner surface. Accordingly, the amount of light that is reflected by the carrier and enters the line sensor 304 is smaller. On the other hand, the amount of light that is reflected by the toner surface and enters the line sensor 304 is larger. If the amount of entering light is too large, a light amount value measured by the line sensor 304 is saturated, and thus an accurate waveform cannot be obtained.

As described above, an appropriate output of the laser light source 301 differs depending on whether light is incident on the carrier surface or on the toner surface. In the present embodiment, the output of the laser light source 301 is controlled such that the value measured by the line sensor 304 is not saturated and the amount of light that enters the line sensor 304 is sufficiently large. In the present embodiment, the output of the laser light source is controlled according to the reflectance of a point at which light from the laser light source 301 is incident. For example, it is judged whether light from the laser light source 301 is incident on the carrier surface or the toner surface (judgment unit). The output of the laser light source 301 is controlled, according to this judgment result.

Generally, the reflectance of the carrier is low, whereas the reflectance of toner is high. In this case, the laser light source 301 may project stronger light onto the carrier surface, and weaker light onto the toner surface. In this case, a waveform peak position can be detected more accurately, and thus the amount of toner can be measured more accurately.

Figure 7:
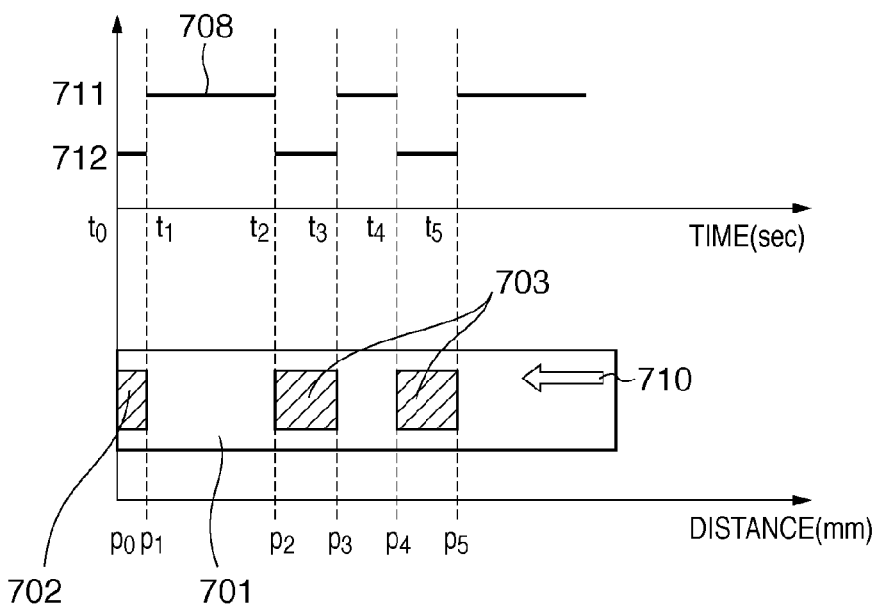
FIG. 7 is a diagram showing a method for controlling the light amount of a laser light source 301 according to Embodiment 1.

Next is a more detailed description of a method for controlling the amount of light, with reference to FIG. 7. In FIG. 7, a carrier 701 to which toner 702 and 703 adheres passes the measurement apparatus 107. The time at which a position $p_0$ on the carrier 701 passes the measurement apparatus 107 is $t_0$. Similarly, the time at which positions $p_1$ to $p_5$ on the carrier 701 pass the measurement apparatus 107 are $t_1$ to $t_5$.

In FIG. 7, toner adheres between $p_0$ and $p_1$, between $p_2$ and $p_3$, and between $p_4$ and $p_5$. The positions where toner adheres are controlled by control signals input to the exposure laser 102. A necessary time period from when a control signal is input to the exposure laser 102 until when a toner image formed in accordance with this control signal passes the measurement apparatus 107 is usually constant. Accordingly, a control unit 801 of the measurement apparatus 107 acquires such control signals, which enables the measurement apparatus 107 to know the times $t_0$ to $t_5$. For example, when the above necessary time period elapses after the input of a control signal for starting generation of the toner 703 (corresponding to the position $p_2$) is the time $t_2$. In this way, the control unit 801 of the measurement apparatus 107 can generate timing signals for controlling the output of the laser light source 301.

The output of the laser light source 301 can be dropped during $t_0$ to $t_1$, $t_2$ to $t_3$, and $t_4$ to $t_5$ by driving the laser light source 301 in accordance with timing signals. For example, the light amount 708 of the laser light source 301 is reduced during $t_2$ to $t_3$ as shown by 712. Further, the light amount of the laser light source 301 is increased during $t_3$ to $t_4$ as shown by 711.

As another method, the measurement apparatus can also be informed that the times $t_0$ and $t_1$ have arrived by using the toner 702 (first toner patch) as a trigger. Specifically, a predetermined pattern such as the toner 702 is formed on the carrier 701 by driving the exposure laser 102 in accordance with a first control signal (first print data). When the measurement apparatus 107 confirms that this predetermined pattern has arrived, the measurement apparatus can be informed that the times $t_0$ and $t_1$ have arrived. Further, a second control signal (second print data) indicating the toner 703 (second toner patch) is input to the exposure laser 102 after a predetermined time period $(t_2-t_0)$ from when the first control signal is input to the exposure laser 102. Specifically, the measurement apparatus 107 can judge that the toner 703 has arrived when a predetermined time period has elapsed from the time $t_0$.

The measurement apparatus 107 can be informed of the time period between the times $t_1$ and $t_2$ by acquiring control signals input to the exposure laser 102. Similarly, the measurement apparatus 107 can also be informed of the time period $t_2$ to $t_3$, the time period $t_3$ to $t_4$, and the time period $t_4$ to $t_5$. In this way, the measurement apparatus 107 can be informed of the times $t_2$ to $t_5$.

Figure 8:
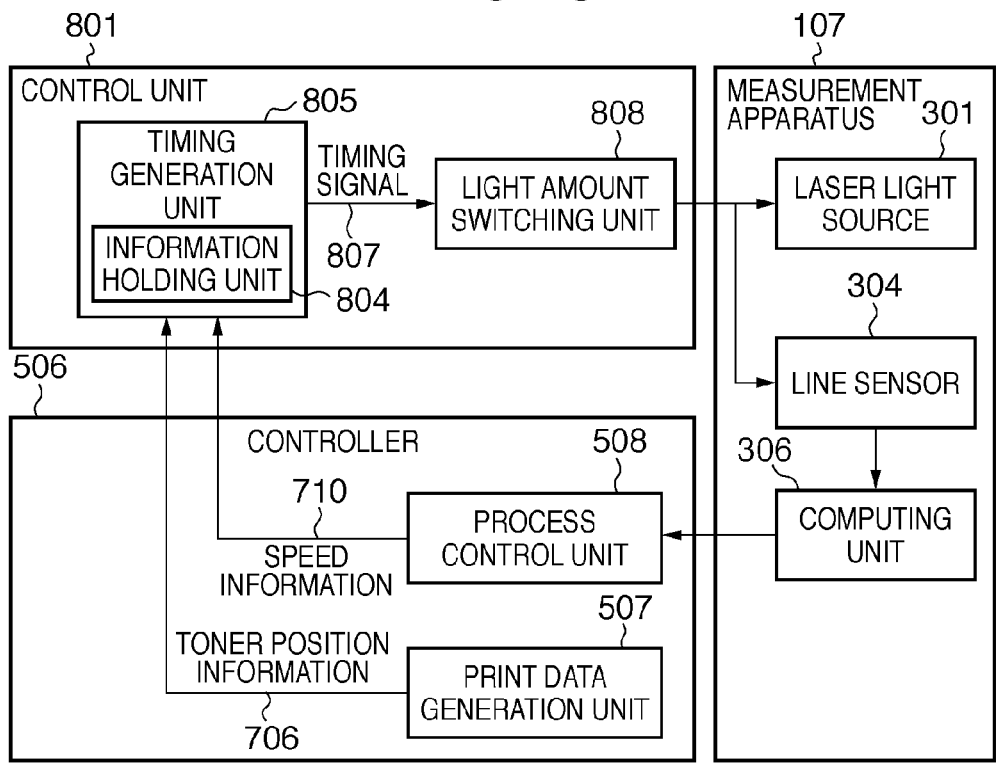
FIG. 8 is a control block diagram of the measurement apparatus according to Embodiment 1.
Figure 12:
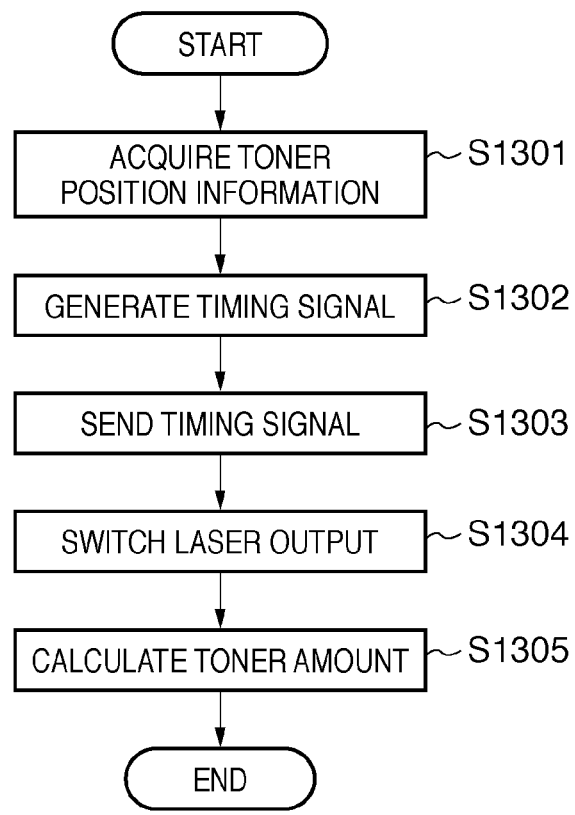
FIG. 12 is a flowchart of processing according to Embodiment 1.

Next is a description of processing according to the present embodiment, with reference to FIG. 8 showing an example of the measurement apparatus 107 and FIG. 12 showing an example of processing performed by the measurement apparatus 107. In step S1301, a timing generation unit 805 that the control unit 801 has acquires toner position information 706 from a print data generation unit 507. If an image is printed based on the input image data, the print data generation unit 507 generates, based on the image data, print data for controlling the exposure laser 102. Since the amount of toner is measured in the flowchart in FIG. 12, the print data generation unit 507 generates print data for printing predetermined measurement patches.

The exposure laser 102, the polygon mirror 103, the charging roller 104, and the developing device 105 cause toner to adhere onto the photosensitive drum 101 based on the print data that has been generated by the print data generation unit 507. The timing generation unit 805 acquires this print data, and extracts the toner position information 706 indicating positions on the carrier where toner adheres. The obtained toner position information 706 is stored in an information holding unit 804 that the timing generation unit 805 has. In step S1301, the timing generation unit 805 further acquires speed information 710 indicating a time period from when print data is input to the laser light source 301 until when the formed toner image passes the measurement apparatus 107.

In step S1302, the timing generation unit 805 generates a timing signal 807 indicating the timing for switching the output of the laser light source 301. The timing signal 807 can be generated by the timing generation unit 805 as described with reference to FIG. 7. Specifically, the timing generation unit 805 judges whether or not toner exists at positions irradiated with laser light in accordance with the toner position information 706, and generates the timing signal 807.

In step S1303, the timing generation unit 805 sends the generated timing signal 807 to a light amount switching unit 808. In step S1304, the light amount switching unit 808 that the control unit 801 has switches the output of the laser light source 301 such that laser light having specified intensity is emitted, in accordance with the timing signal 807. In step S1305, the computing unit 306 calculates the amount of toner on the photosensitive drum 101 based on the waveform measured by the line sensor 304. The calculated toner amount is fed back to a controller 506. The controller 506 controls the print data generation unit 507 and a process control unit 508 according to that toner amount.

In the present embodiment, a method for changing incident light intensity according to the presence/absence of toner on the carrier has been mainly described. However, incident light intensity can also be changed according to the type of toner on the carrier. For example, the timing generation unit 805 can acquire the toner position information 706 indicating what color toner adheres to which positions on the carrier. In this way, the timing generation unit 805 can control the light amount switching unit 808 and the laser light source 301 such that light having intensity suitable for the color of toner is projected. For example, light having different intensity may be projected onto respective toner of four colors, that is, CMYK.

Moreover, the light amount switching unit 808 can also control the intensity of light projected by the laser light source 301, taking into consideration the light reflectance of the carrier. Further, the light amount switching unit 808 can also control the light reception sensitivity of the line sensor 304 according to the presence/absence of toner on the carrier. The present embodiment has been described assuming that the light reflectance of toner is higher than that of the carrier. However, the method of the present embodiment is also applicable to the case where the light reflectance of toner is lower than that of the carrier. In this case, it is sufficient to set laser light intensity with respect to the toner surface to be higher than that of the laser light intensity with respect to the carrier (first intensity).

In the present embodiment, the timing generation unit 805 acquires, from the process control unit 508, the speed information 710 indicating a time period from when print data is input to the laser light source 301 until when the formed toner image passes the measurement apparatus 107. However, a time period from when predetermined print data generated by the print data generation unit 507 is input to the laser light source 301 until when the measurement apparatus 107 observes a toner image formed in accordance with the print data may be actually measured.

Embodiment 2

Figure 9:
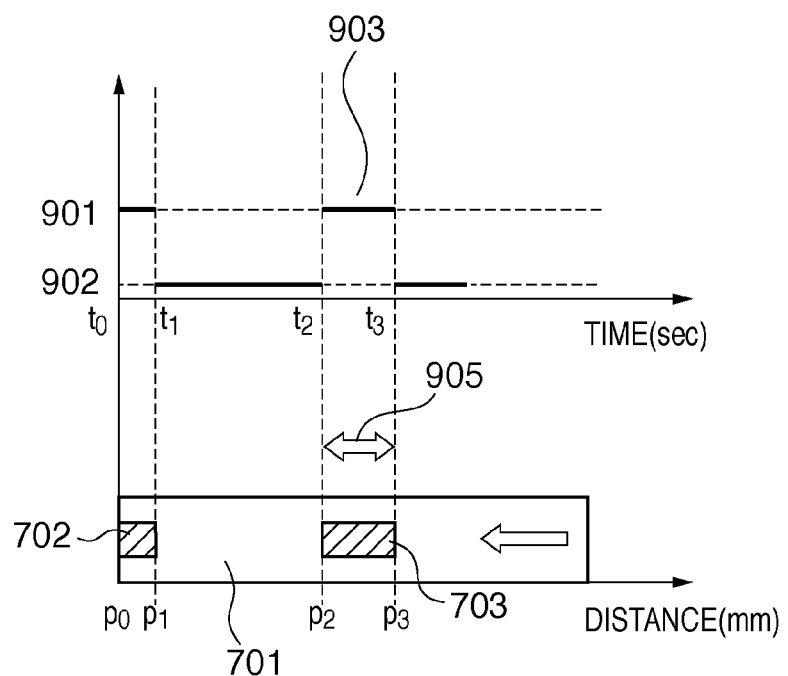
FIG. 9 is a diagram showing a method for setting the light amount of the laser light source 301 according to Embodiment 2.

In the present embodiment, a belt conveying speed and an appropriate amount of projected light are determined by measuring a patch of a known size, before measuring the amount of toner in accordance with Embodiment 1. In the present embodiment, the same numerals are given to the same elements as those in Embodiment 1, and a description thereof is omitted. FIG. 9 is a diagram illustrating the present embodiment. In the present embodiment, the toner 702 and 703 having a known length formed on the carrier 701 is measured using the laser light source 301 that performs constant output. A length L (905) of the patch can be measured using, for example, an apparatus placed in the vicinity of the measurement apparatus 107.

The line sensor 304 measures the intensity of light reflected by the carrier 701 or the toner surface of the toner 702 and 703. In this way, the computing unit 306 can obtain a light amount profile 903. According to the light amount profile 903, a time period necessary for the toner 703 having the length L to pass is as follows:

$$\Delta t = t_3 - t_2$$

Accordingly, a conveying speed S of the carrier can be calculated as follows:

$$S = L/\Delta t$$

The conveying speed of the carrier can also be calculated by measuring a plurality of patches and obtaining a statistical value, an example of which is an average value.

Figure 10:
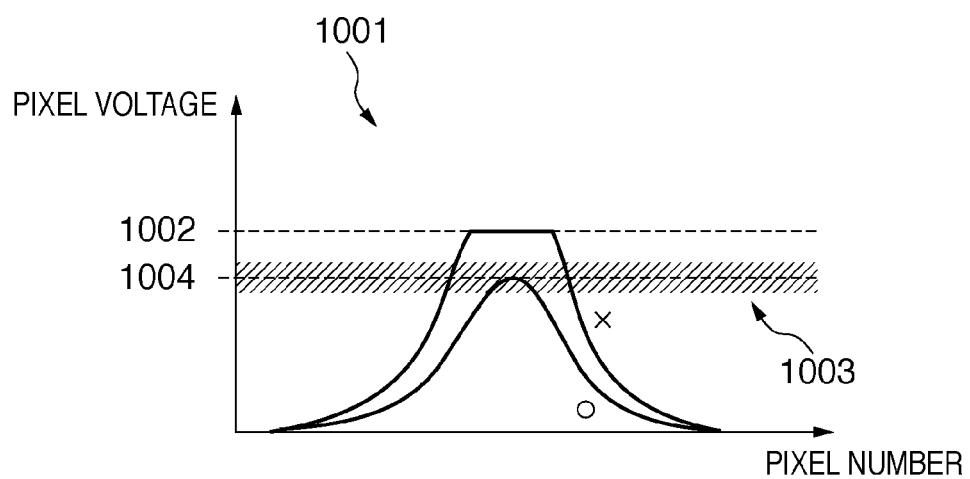
FIG. 10 is a diagram showing the method for setting the light amount of the laser light source 301 according to Embodiment 2.

An amount of light 901 reflected by the toner surface and an amount of light 902 reflected by the carrier surface can be known from the light amount profile 903. Using these, the computing unit 306 can determine the amounts of light 711 and 712 in FIG. 7. A configuration is adopted in which when determining the amounts of light 711 and 712, values measured by the line sensor 304 will be within a predetermined range. For example, it is necessary to prevent the values measured by the line sensor 304 from being saturated. For example, as shown in FIG. 10, with regard to a waveform 1001 output by the line sensor 304, it is necessary to avoid the output voltage exceeding a saturation voltage level 1002.

In order to prevent this, it is sufficient that the computing unit 306 sets laser output or sensor sensitivity such that a peak voltage 1004 remains within an allowable range 1003 that is lower than the saturation voltage level. For example, the appropriate amounts of light 711 and 712 can be determined by repeating measurements while changing the output of the laser light source 301.

The measured conveying speed or the determined amounts of light may be stored in the light amount switching unit 808, for example. In this case, it is not necessary to measure these every time measurement of a toner amount starts. It is sufficient to perform measurement again either when printing for a predetermined number of sheets is performed or when a peak voltage output by the line sensor 304 has varied. Further, the amounts of light 711 and 712 that are different from each other may be determined according to the color of toner.

Embodiment 3

In Embodiment 1, incident light intensity changes according to the presence/absence of toner on the carrier. Accordingly, in order to obtain the amount of light reflected by the carrier or the toner surface, it is possible to correct values measured by the line sensor 304 in accordance with incident light intensity. Below is a description of a method for correcting values measured by the line sensor 304. In the present embodiment, the same numerals are given to the same elements as those in Embodiments 1 and 2, and a description thereof is omitted.

Figure 11:
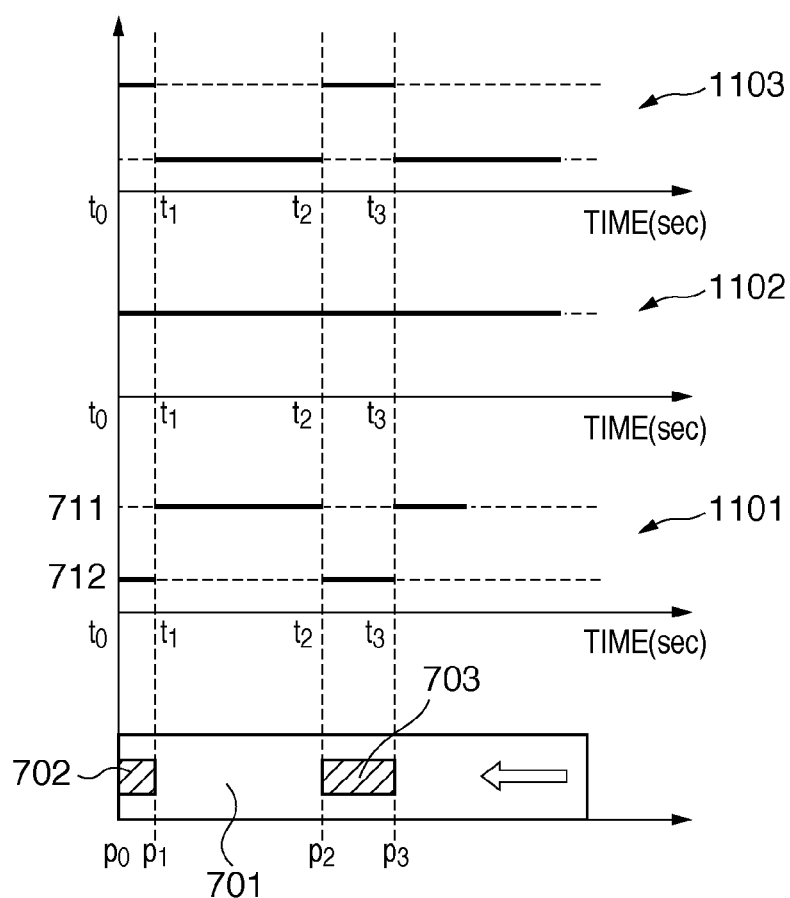
FIG. 11 is a diagram showing a method for correcting a measurement signal according to Embodiment 3.

FIG. 11 shows a temporal change of signals in the case of measuring the amount of adhering toner while switching the light amount between 711 and 712. In FIG. 11, 1101 is a light amount timing chart. Laser light of the large light amount 711 is irradiated while performing measurement with respect to the carrier 701 having low reflectance. Further, laser light having the small light amount 712 is irradiated while performing measurement with respect to the toner 703 having high reflectance. Thus, the line sensor 304 outputs a signal as shown by a waveform 1102 having few changes.

A waveform 1103 that appropriately reflects the intensity of reflected light can be obtained by multiplying the waveform 1102 by the ratio of the light amount 711 to the light amount 712. Specifically, the computing unit 306 acquires the timing signal 807 from the timing generation unit 805. Further, the computing unit 306 obtains values that indicate the light amounts 711 and 712 that the light amount switching unit 808 has. In this way, the computing unit 306 corrects the waveform 1102 obtained from the line sensor 304.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-119731, filed May 25, 2010 which is hereby incorporated by reference herein in its entirety.

What is claimed is:

1. An information processing apparatus for determining a height of a toner image formed on a carrier, the apparatus comprising:
   a control unit configured to control an irradiation unit to provide irradiation light on the toner image and the carrier for determining the height of the toner image, wherein the control unit is further configured to switch an amount of the irradiation light based on whether the irradiation light is irradiated onto the toner image or onto the carrier in accordance with print data;
   an acquisition unit configured to acquire an image obtained by capturing reflected light of the laser light irradiated by said irradiation unit; and
   a determination unit configured to determine the height of the toner image based on the acquired image.

2. The information processing apparatus according to claim 1, wherein said control unit is further configured to control the amount of irradiation light such that the amount of irradiation light when the laser light is irradiated onto the toner image is smaller than the amount of irradiation light when the laser light is irradiated onto a region other than the toner image.

3. The information processing apparatus according to claim 1, wherein said control unit is further configured to judge whether laser light irradiated by said irradiation unit is irradiated, in accordance with the print data for controlling formation of a toner image on the carrier, onto the toner image.

4. The information processing apparatus according to claim 3,
   wherein the print data includes first print data that represents a first toner patch including a toner image, and second print data that represents a second toner patch including a toner image,
   the second print data is input to a formation unit configured to form a toner image after a predetermined time period from when the first print data is input to said formation unit,
   said control unit is further configured to detect that laser light is irradiated onto the first toner patch by said irradiation unit based on the image acquired by said acquisition unit, and
   said control unit is further configured to judge whether laser light irradiated by said irradiation unit is irradiated onto the toner image in accordance with the second print data after the predetermined time period from when the detection is performed.

5. The information processing apparatus according to claim 3, wherein said control unit is further configured to hold a necessary time period from when the print data is input to a formation unit configured to form a toner image until when laser light is irradiated by said irradiation unit to a toner image in accordance with the print data, and judge whether laser light irradiated by said irradiation unit in accordance with the print data is irradiated onto the toner image after the necessary time period from when the print data is input to said formation unit.

6. The information processing apparatus according to claim 1, wherein said control unit is further configured to set an intensity of laser light irradiated by said irradiation unit such that an amount of reflected light of the laser light acquired by said acquisition unit is within a predetermined range.

7. A printing apparatus comprising the information processing apparatus according to claim 1, the printing apparatus performing printing control with reference to a height of a toner image measured by said information processing apparatus, such that a toner amount of toner adhering to a printing medium is constant.

8. An information processing method for determining a height of a toner image formed on a carrier, the method comprising:
controlling an irradiation unit to provide irradiation light on the toner image and the carrier for determining the height of the toner image, wherein a control unit is configured to switch an amount of the irradiation light based on whether the irradiation light is irradiated onto the toner image or onto the carrier in accordance with print data;
acquiring an image obtained by capturing reflected light of the laser light irradiated by said irradiation unit; and
determining the height of the toner image based on the acquired image.

9. A non-transitory computer-readable medium storing a program for instructing a computer, in determining a height of a toner image formed on a carrier, to:
control an irradiation unit to provide irradiation light on the toner image and the carrier for determining the height of the toner image, wherein a control unit is configured to switch an amount of the irradiation light based on whether the irradiation light is irradiated onto the toner image or onto the carrier in accordance with print data;
acquire an image obtained by capturing reflected light of the laser light irradiated by said irradiation unit; and
determine the height of the toner image based on the acquired image.

10. A measurement apparatus comprising:
a light irradiation unit configured to provide a first light onto a surface of a carrier or a surface of a toner patch on the carrier and to provide a second light onto a transfer unit, wherein the second light is weaker than the first light;
a light reception unit configured to receive light reflected from the surface of the carrier or the transfer unit and from the surface of the toner patch on the carrier or the transfer unit; and
a calculation unit configured to calculate:
a first position of the light reception unit based on the first light reflected from the carrier or the transfer unit, wherein the light reflected from the surface of the carrier or the transfer unit is received at the first position of the light reception unit;
a second position of the light reception unit based on the second light reflected from the surface of the toner patch on the carrier or the transfer unit, wherein the light reflected from the surface of the toner patch on the carrier or the transfer unit is received at the second position of the light reception unit; and
information indicating a height of the toner patch based on the first position and the second position.

11. The measurement apparatus according to claim 10, wherein the calculation unit is further configured to calculate the first position and the second position based on a peak position of a received light amount at the light reception unit.

12. The measurement apparatus according to claim 10, wherein a light amount of the second light is controlled so that a light amount value measured by the light reception unit is not saturated when the light reception unit measures the light amount value of the second light reflected from the surface of the toner patch on the carrier or the transfer unit.

13. The measurement apparatus according to claim 10, wherein the calculation unit is further configured to calculate the information indicating the height of the toner patch based on a difference between the first position and the second position.

14. A measurement method comprising:
providing a first light onto a surface of a carrier or a surface of a toner patch on the carrier and providing a second light onto a transfer unit, wherein the second light is weaker than the first light;
receiving light reflected from the surface of the carrier or the transfer unit and from the surface of the toner patch on the carrier or the transfer unit, at a light reception unit;
calculating a first position of the light reception unit based on the first light reflected from the carrier or the transfer unit, wherein the light reflected from the surface of the carrier or the transfer unit is received at the first position of the light reception unit;
calculating a second position of the light reception unit based on the second light reflected from the surface of the toner patch on the carrier or the transfer unit, wherein the light reflected from the surface of the toner patch on the carrier or the transfer unit is received at the second position of the light reception unit; and
calculating information indicating a height of the toner patch based on the first position and the second position.

15. A non-transitory computer-readable medium storing a program for instructing a computer to:
provide a first light onto a surface of a carrier or a surface of a toner patch on the carrier and provide a second light onto a transfer unit, wherein the second light is weaker than the first light;
receive light reflected from the surface of the carrier or the transfer unit and from the surface of the toner patch on the carrier or the transfer unit, at a light reception unit;
calculate a first position of the light reception unit based on the first light reflected from the carrier or the transfer unit, wherein the light reflected from the surface of the carrier or the transfer unit is received at the first position of the light reception unit;
calculate a second position of the light reception unit based on the second light reflected from the surface of the toner patch on the carrier or the transfer unit, wherein the light reflected from the surface of the toner patch on the carrier or the transfer unit is received at the second position of the light reception unit; and calculate information indicating a height of the toner patch based on the first position and the second position.

* * * * *